(12) United States Patent
Yan

(10) Patent No.: US 8,654,632 B2
(45) Date of Patent: Feb. 18, 2014

(54) METHOD FOR FAST SWITCHING TRAFFIC IN H-VPLS

(75) Inventor: Neng Yan, Beijing (CN)

(73) Assignee: Hangzhou H3C Technologies Co., Ltd., Zhejiang (CN)

(*) Notice: Subject to any disclaimer, the term of this patent is extended or adjusted under 35 U.S.C. 154(b) by 78 days.

(21) Appl. No.: 13/421,625

(22) Filed: Mar. 15, 2012

(65) Prior Publication Data

US 2012/0236868 A1 Sep. 20, 2012

(30) Foreign Application Priority Data

Mar. 18, 2011 (CN) .......................... 2011 1 0066570

(51) Int. Cl.
*H04L 1/00* (2006.01)
*H04L 12/28* (2006.01)
*G06F 15/173* (2006.01)

(52) U.S. Cl.
USPC .......................................................... 370/228

(58) Field of Classification Search
None
See application file for complete search history.

(56) References Cited

U.S. PATENT DOCUMENTS

| 7,835,272 B1 * | 11/2010 | Johnson et al. ............... 370/228 |
| 2009/0010182 A1 * | 1/2009 | Tochio ........................... 370/254 |
| 2009/0245261 A1 * | 10/2009 | Khan et al. ................. 370/395.53 |
| 2010/0165832 A1 * | 7/2010 | Kini et al. ..................... 370/217 |
| 2011/0310730 A1 * | 12/2011 | Kini et al. ..................... 370/225 |
| 2012/0002539 A1 * | 1/2012 | Khan et al. .................... 370/227 |
| 2012/0147737 A1 * | 6/2012 | Taylor et al. ................... 370/219 |

FOREIGN PATENT DOCUMENTS

| CN | 101127637 | 2/2008 |
| CN | 101252428 | 8/2008 |
| CN | 101340351 | 1/2009 |
| CN | 101710875 | 5/2010 |
| CN | 101860482 | 10/2010 |
| CN | 101924654 | 12/2010 |
| WO | 2011/021180 | 2/2011 |

OTHER PUBLICATIONS

CN First Office Action dated Jan. 5, 2013 issued on CN Patent Application No. 201110066570.7 filed on Mar. 18, 2011, The State Intellectual Property Office, P.R. China.
M. Lasserre, Ed., V. Kompella, Ed., "Virtual Private LAN Service (VPLS) Using Label Distribution Protocol (LDP) Signaling", IETF RFC 4762, Jan. 31, 2007.

* cited by examiner

*Primary Examiner* — Clemence Han

(57) ABSTRACT

In a method for fast switching traffic in a hierarchical virtual private LAN service for use in a User-facing Provider Edge (UPE) device, a shared logic port number is assigned to each pair of primary pseudo wire and standby pseudo wire. A MAC address associated with a pair of primary pseudo wire and standby pseudo wire is associated with a logic port number shared by the primary pseudo wire and standby pseudo wire. Filling, in a logic port table, for each logic port entries containing: a logic port number, a primary pseudo wire inbound-label, a standby pseudo wire inbound-label, a primary pseudo wire outbound-label, a standby pseudo wire outbound-label and information of leaving a public network. Setting the corresponding information of leaving the public network in the logic port table depending upon whether the primary pseudeo wire is active or inactive.

8 Claims, 2 Drawing Sheets

METHOD FOR FAST SWITCHING TRAFFIC IN H-VPLS

CLAIM FOR PRIORITY

The present application claims priority under 35 U.S.C 119 to Chinese application number 201110066570.7, filed on Mar. 18, 2011, which is incorporated by reference in its entirety.

BACKGROUND

Virtual Private LAN Service (VPLS) is a point-to-multipoint Layer 2 Virtual Private Network (L2VPN) service provided in a public network. It is different from the point to point (P2P) connection service provided by a traditional Virtual Private Network (VPN). In VPLS, users are connected to one another by a multipoint network, and by way of having a series of virtual switches created on a provider edge (PE) rented to the users, the service is provided. The networking of the virtual switches is the same as that of the traditional switches, and in this way, the users can build their own local Area Network (LAN) by way of a Metropolitan Area Network (MAN) or a Wide Area Network (WAN). VPLS is also referred to as Transparent LAN Service (TLS) or Virtual Private Switched Network Service.

BRIEF DESCRIPTION OF THE DRAWINGS

The accompanying drawings illustrate various examples of various aspects of the present disclosure. It will be appreciated that the illustrated element boundaries (e.g., boxes, groups of boxes, or other shapes) in the figures represent one example of the boundaries. It will be appreciated that in some examples one element may be designed as multiple elements or that multiple elements may be designed as one element. In some examples, an element shown as an internal component of another element may be implemented as an external component and vice versa.

DEFINITIONS

Figure 1:
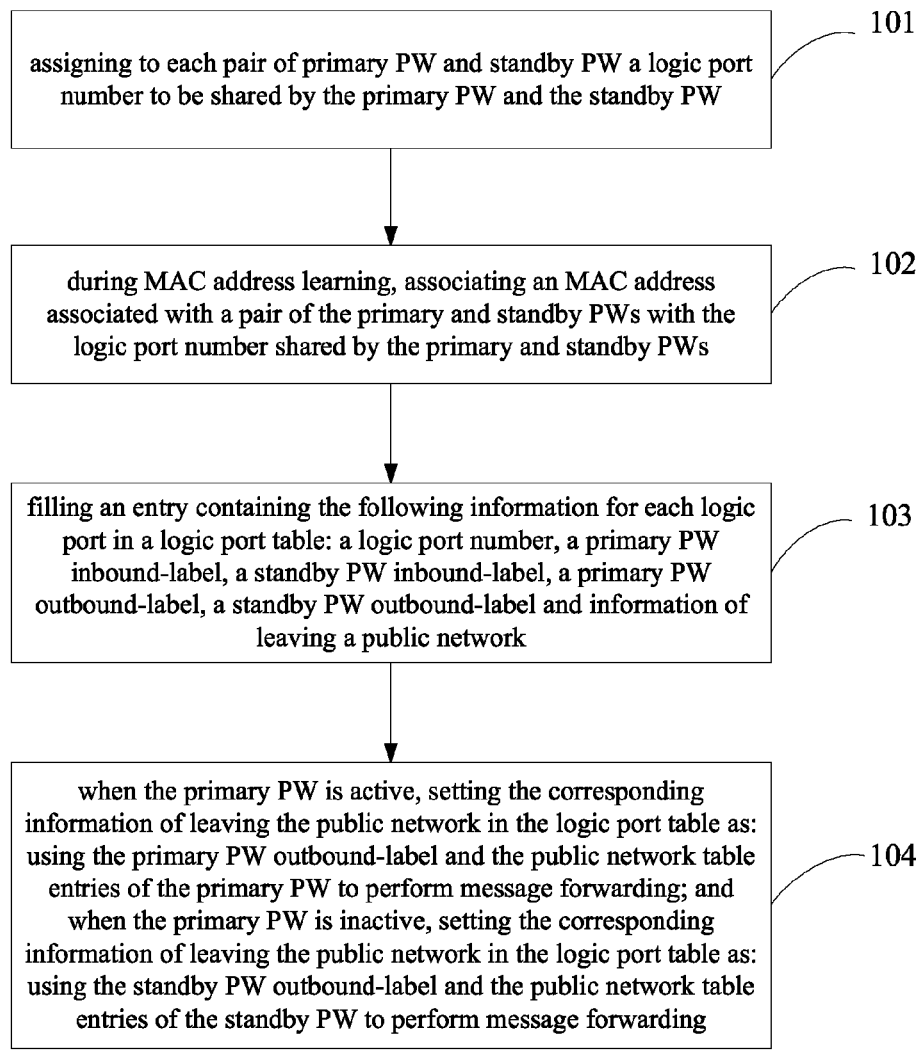
FIG. 1 illustrates a method for fast switching traffic in H-VPLS according to an example.

The following includes definitions of selected terms employed herein. The definitions include various examples and/or forms of components that fall within the scope of a term and that may be used for implementation. The examples are not intended to be limiting. Both singular and plural forms of terms may be within the definitions.

Multi-protocol Label Switching (MPLS): which uses a fixed-length label to encapsulate packets, and performs forwarding based on the label.

Customer Edge (CE): which is an edge device in a user network and has an interface for direct connection with a Service Provider (SP). A CE can be a router or a switch, and also can be a host computer. A CE does not "sense" the existence of VPN, and does not have to support MPLS either.

Provider Edge (PE), which is an edge device in a service provider network and is connected with a CE, and it is mainly responsible for access of VPN services. It performs mapping and forwarding for a message from a private network to a public network tunnel and from a public network tunnel to a private network.

Site: which refers to a group of networks or subnets that are a part of a user network and connect to a VPN through one or more PE/CE links. VPN refers to a group of sites that share the same routing information. A site can be located in several different VPNs at the same time.

Forwarder: after a PE receives a data frame sent on an AC, a forwarder selects a PW for forwarding the frame and the forwarder is actually a forwarding table of the VPLS.

Pseudo Wire (PW): which is consisted of a pair of unidirectional virtual circuit label switched paths (VC LSPs) with opposite directions.

Attachment Circuit (AC): a connection link or pseudo wire between a CE and a PE.

Tunnel: which is used to carry a PW. A tunnel can carry multiple PWs and is normally an MPLS tunnel. A tunnel is a direct connection passage between a local PE and a peer PE and is used to transmit data between PEs.

UPE: User-facing Provider Edge, which is a PE device close to the user side and mainly acts as an aggregation device for users to access VPN and is used for connecting a CE and the service provider network;

NPE: Network Provider Edge, which is a network core PE device, and is located on the edge of a core domain of a VPLS network and provides the VPLS transparent transmission service for user's messages between core networks; and Inactive: in this context an inactive PW refers to a PW which is not currently working and cannot be used for forwarding, e.g. due to a temporary network failure.

DETAILED DESCRIPTION

In VPLS, accessibility is provided by learning source MAC addresses. Each PE device maintains a bridge MAC address table. The process of learning MAC addresses includes the following two parts:

one part is to learn remote MAC addresses related to PWs. As described above, a PW is consisted of a pair of unidirectional VC LSPs (only when the VC LSPs in both directions are up, a PW is considered to be up). After an initially unknown MAC address has been learnt on a VC LSP in the inbound direction, the PW needs to form a mapping relationship between this MAC address and a VC LSP in the outbound direction; and the other part is to learn local MAC addresses of ports that are connected directly to the users: for a message transmitted by a CE, it is necessary to learn the source MAC address in the message and associate it with a corresponding port in a virtual switch instance (VSI), wherein the VSI is a functional instance of VPLS on a PE device.

In a process of learning MAC addresses and flooding by a PE, in order to avoid loops, a layer 2 network is generally required to enable a Spanning Tree Protocol (STP). However, a user using the VPLS will not sense the network of the Internet Service Provider (ISP), and therefore when the STP is enabled at the side of the private network, the network of the ISP cannot be taken into consideration. In VPLS, the full mesh and horizontal split forwarding are used to avoid using on the ISP the STP protocol at the side of the VPLS private network.

In order to avoid loop in VPLS, PEs are fully meshed logically (the PW full mesh). That is to say, each PE has to create, for each VPLS forwarding instance, a tree leading to all the other PEs under the instance. And each PE device has to support a horizontal split strategy to avoid loops, namely the PEs cannot forward messages between PWs having the same VSI (because each PE in the same VSI is directly connected to each other). That is to say, a data packet received from a PW at the side of the public network is no longer forwarded to other PWs, and is only forwarded to the private network side. This is why the PW full mesh needs to be built between VSI instances in VPLS.

Because VPLS requires a full mesh among PEs, therefore the relationship between the number of PWs and the number of PE devices in a VPLS instance is that: the number of PWs=the number of PEs×(the number of PEs−1)/2. In the case of a relatively large VPLS network, the number of PWs is very large, the signaling overheads of PWs are very high, and both management and expansion of the network would become complicated.

In order to simplify network management and to improve network scalability, a networking mode of Hierarchical VPLS (H-VPLS) is introduced. H-VPLS divides the PEs into UPEs and NPEs, the definitions of which have been described above. A UPE does not need to build a full mesh with all NPEs, and the full mesh is only needed between NPEs. By way of hierarchy, the H-VPLS reduces the number of PWs and the burden of PW signaling.

For instance, an example of H-VPLS network includes three NPEs (e.g. NPE1, NPE2 and NPE3) and a UPE. The three NPEs are coupled to each other via N-PWs, which refer to a PW between an NPE and another NPE, and the UPE is coupled to two CEs (e.g. CE1 and CE2). The UPE is also coupled to an NPE (e.g. NPE1) via a U-PW, which refers to a PW between an NPE and a UPE. Please be noted that, the UPE, which acts as an aggregation device Multi-Tenant Unit Switch (MTU-s), only establishes an access link U-PW (which is a virtual link) with NPE1, and does not establish a virtual link with any of the other peers such as NPE2 and NPE3. Although the present example mentions three NPEs and one UPEs, it will be appreciated that these numbers just serve as an example and that a H-VPLS network can include different number of NPEs and UPEs. It will be further appreciated that the UPE can also couple to another NPE such as NPE2 or NPE3 instead of NPE1 and that any number of CEs can be coupled to each NPE.

In the above described H-VPLS network example, the process of data forwarding is as follows:
(1) the UPE is responsible for transmitting a message sent by a CE (e.g. CE1 or CE2) to NPE1, and at same time tags the message with a multiplexing separation mark (MPLS label) corresponding to the U-PW;
(2) after receiving the message, NPE1 first determines the VSI to which the message belongs according to the multiplexing separation mark, and then pushes a multiplexing separation mark corresponding to the N-PW into the message according to the destination MAC of the message, and then forwards the message; and
(3) after receiving a message from the N-PW side, NPE1 tags it with a multiplexing separation mark corresponding to the U-PW and sends the message to the UPE, which in turn will forward the message to a corresponding CE.

If the data exchange between CE1 and CE2 is an exchange between local CEs, since the UPE itself has a bridging function, the UPE will directly perform the message forwarding between them, without sending the message to NPE1. However, for a first data message of which the destination MAC address is unknown or a broadcast message, the UPE broadcasts the data to CE2 through a bridge, and at the same time, forwards the message via U-PW to NPE1, which will copy the message and forward it to peer CEs.

In this example, there is only one single link connection between UPE and NPE. Therefore, once the access link becomes inactive, all the VPNs connected by the aggregation device will lose their connectivity. Thus, there needs to be a redundant standby link. For instance, in the above mentioned example, in addition to the primary link U-PW between UPE and NPE1, a redundant standby link could exist between UPE and NPE2. Under normal circumstances, a device only uses a primary PW for forwarding, and once the VPLS system detects an inactive primary PW, a standby PW is then activated to forward user's messages.

As previously described, under the VPLS networking, each PW can be described as a logic port which has its own port number. When a primary PW is used for forwarding, an example of the MAC address table on UPE is shown in table 1:

TABLE 1

| MAC address | Port |
| --- | --- |
| A | PW1 |
| B | PW1 |
| C | PW1 |

When the primary PW becomes inactive and it is switched to the standby PW for forwarding, the UPE cannot use the MAC address table shown in table 1 to forward any more. At this time, fast switching needs to be performed for the MAC traffic over UPE and NPE2. The fast switching for the MAC traffic over NPE2 can be achieved using the MAC address recovering message described in RFC4762. However, RFC does not describe how to perform fast switching for the MAC traffic over UPE.

There are three ways for generating a new MAC address table on the UPE: (1) enabling an MAC address broadcast, and updating the MAC address table by learning MAC addresses; (2) refreshing the port of each entry in the MAC address table to be the port number of the standby PW; (3) deleting original entries in the MAC address table, and re-starting to learn MAC addresses.

An example of the new MAC address table on the UPE is as shown in table 2:

TABLE 2

| MAC address | Port |
| --- | --- |
| A | PW2 |
| B | PW2 |
| C | PW2 |

In case that the primary PW and the standby PW are respectively assigned a logic port number and the primary PW and the standby PW respectively occupy an entry in the logic port table on the UPE, since the primary and standby PWs will not be active at the same time on the forwarding plane, only one of these entries can instruct the forwarding at any time. Therefore, the primary and standby PWs can share a logic port number.

According to an example of the present disclosure, a primary PW and a standby PW share the same logic port number and when it needs to switch from the primary PW to the standby PW or switch back from the standby PW to the primary PW, the switching is achieved by modifying the information of leaving the public network in the logic port table, so that the traffic can be quickly forwarded to a corresponding PE through an active PW without the switching between the primary PW and the standby PW being sensed by the MAC address table.

In the following, certain examples are described in detail with reference to the drawings.

With reference to FIG. 1 first, FIG. 1 illustrates a method for fast switching traffic in H-VPLS according to an example. The method is suitable for use in a UPE and comprises:

Block 101: assigning to each pair of primary PW and standby PW a logic port number to be shared by the primary PW and the standby PW;

Block 102: during MAC address learning, associating an MAC address associated with a pair of the primary and standby PWs with the logic port number shared by the primary and standby PWs;

Block 103: filling an entry containing the following information for each logic port in a logic port table: a logic port number, a primary pseudo wire inbound-label, a standby pseudo wire inbound-label, a primary pseudo wire outbound-label, a standby pseudo wire outbound-label and information of leaving a public network; and Block 104: when the primary pseudo wire is active, setting the corresponding information of leaving the public network in the logic port table as: using the primary pseudo wire outbound-label and the public network table entries of the primary pseudo wire to perform message forwarding; and when the primary pseudo wire is inactive, setting the corresponding information of leaving the public network in the logic port table as: using the standby pseudo wire outbound-label and the public network table entries of the standby pseudo wire to perform message forwarding.

In this example, with regard to block 101, the assigning of a logic port number to be shared by the primary PW and the standby PW can be performed throughout the process of generating a PW, which generally includes three stages: (1) a user inputs configurations (2) the PW signaling generates a control plane entry of the logic port table and sends it down to a data plane and (3) the data plane saves the forwarded entry. That is to say, the assigning can occur in all these three stages.

However, because it is likely that the PWs would change frequently in the last two stages and thus the association between the MAC address and the logic port would not be stable, according to an example of the present disclosure, a logic port number to be shared by the primary and standby PWs is assigned when the user inputs configurations. In particular, when a user designates the primary and standby peers under VSI, for example when the user inputs peer 1.1.1.1 and standby-peer 2.2.2.2, a logic port number is assigned to them. According to an example, the assigned logic port number to be shared by the primary and standby PWs is unique within this VSI so that the interference between VSIs can be avoided.

According to an example, each entry in the logic port table can also include the information of a primary peer IP address and a standby peer IP address.

Figure 2:
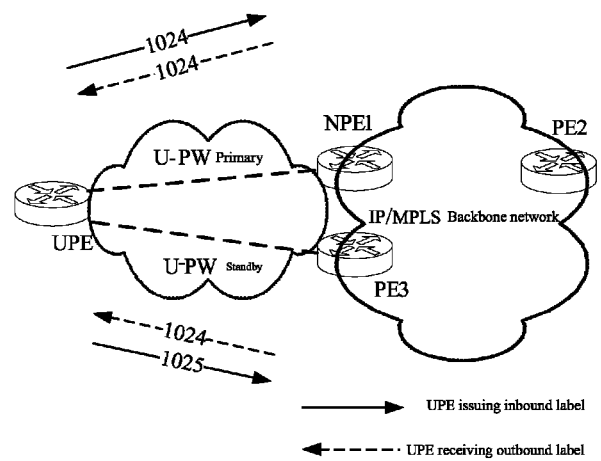
FIG. 2 illustrates a schematic diagram for message forwarding according to an example.

A more detailed description of message forwarding according to an example of the present disclosure is given below with reference to FIG. 2. FIG. 2 illustrates a schematic diagram for message forwarding according to an example. As shown in FIG. 2, the IP/MPLS backbone network comprises UPE, NPE1, PE2, and PE3, and a primary PW exists between the UPE and NPE1 and a standby PW exists between the UPE and PE3. As noted previously, the number of NPEs or UPE shown in FIG. 2 is just illustrative and the backbone network can include different number of NPEs or UPEs. The solid arrow in FIG. 2 indicates the issuing of an inbound-label towards outside by the UPE and the dashed arrow indicates the receiving of an outbound-label by the UPE.

In this example, when a user designates the primary and standby peers under VSI, a shared logic port number is assigned to them.

First of all, after the user inputs configurations, the logic port table is filled in. The logic port table is mainly filled as shown in table 3:

TABLE 3

| Port number | Primary peer IP address | Standby peer IP address | Other information |
| --- | --- | --- | --- |

Then the PW signaling generates a control plane entry. The content at the right of port number in table 4 shown below is the content filled in the logic port table by this operation:

TABLE 4

| Port number | Primary PW inbound-label | Standby PW inbound-label | Primary PW outbound-label | Standby PW outbound-label | Information of leaving the public network |
| --- | --- | --- | --- | --- | --- |

Next, these contents are sent down to the data plane which saves them in the manner of one logic port table for each VSI. Wherein, whether the IP addresses of the primary and standby peers need to be sent to the data plane can be determined according to the actual needs, and during data forwarding, more attention is paid to the label and information of leaving the public network.

Taking FIG. 2 as an example, detailed content of a primary and standby PW table entry is as shown in Table.5:

TABLE 5

| Port number | Primary peer IP address | Standby peer IP address | Primary PW Inbound label | Standby PW Inbound label | Primary PW Outbound label | Standby PW Outbound label | Information of leaving public network | Other information |
| --- | --- | --- | --- | --- | --- | --- | --- | --- |
| 1 | NPE1 | PE3 | 1024 | 1025 | 1024 | 1024 | | |

An example of the MAC address table is shown in table 6:

TABLE 6

| MAC | Port number |
| --- | --- |
| A | 1 |
| B | 1 |
| C | 1 |

When the link on which the primary PW is located is active, the information of leaving the public network in the logic port table is set as "leaving the primary PW public network", indicating that the message is forwarded to a corresponding PE (i.e. NPE1) using the primary PW outbound-label and the public network entries of the primary PW. At this time, the content of the logic port table is as shown in table 7:

TABLE 7

| Port number | Primary peer IP address | Standby peer IP address | Primary PW Inbound-label | Standby PW Inbound-label | Primary PW Outbound label | Standby PW Outbound label | Information of leaving public network |
|---|---|---|---|---|---|---|---|
| 1 | NPE1 | PE3 | 1024 | 1025 | 1024 | 1024 | Leaving primary PW public network |

Because the specific content of the public network entry is not essential here, therefore the public network entries associated with the primary PW are generally referred to as the public network entries of the primary PW and the public network entries associated with the standby PW are generally referred to as the public network entries of the standby PW herein.

If the link on which the primary PW is located becomes inactive, switching to the standby PW is effected by only modifying the corresponding information of leaving the public network in the logic port table to "leaving the standby PW public network". "Leaving the standby PW public network" indicates that the message is forwarded to a corresponding PE (i.e. PE3) using the standby PW outbound-label and the public network entries of the standby PW, and the MAC address table does not need to be modified or deleted. At this time, the content of the logic port table is as shown in table 8:

TABLE 8

| Port number | Primary peer IP address | Standby peer IP address | Primary PW Inbound-label | Standby PW Inbound-label | Primary PW Outbound label | Standby PW Outbound label | Information of leaving the public network |
|---|---|---|---|---|---|---|---|
| 1 | NPE1 | PE3 | 1024 | 1025 | 1024 | 1024 | Leaving the standby PW public network |

If the failure on the link on which the primary PW is located is removed, the forwarding is restored by only modifying the information of leaving the public network in the logic port table to "leaving the primary PW public network", indicating that the message is forwarded to a corresponding PE (i.e. NPE1) using the primary PW outbound-label and the public network entries of the primary PW, and the MAC address table still does not need to be modified or deleted. At this time, the content of the logic port table is as shown in table 7.

It can be seen from the above described examples that, no matter it is the primary-standby PW switching or back-switching, the MAC address table does not sense the switching, and the traffic can be forwarded correctly to the corresponding PE.

As described previously, since the VPLS is in full mesh, when the UPE has learned the MAC address from the PW side, both NPE1 and PE3 would certainly have learned it as well. In this way, no matter the forwarding is carried out by using the primary PW or by switching to the standby PW, NPE1 or PE3 can forward the MAC traffic sent by the UPE successfully.

In case that the primary and standby PWs on the UPE occupy two table entries, when the primary-standby switching is carried out, it has to modify or delete the entries in the MAC address table. According to an example of the present disclosure, the primary and standby PWs occupy one table entry, and the MAC address table does not sense the primary-standby switching. When the primary PW is inactive and switched to the standby PW, or when the failure in the primary PW is removed and the forwarding operation is restored from the standby PW to the primary PW, because the update of the MAC address table is not triggered, therefore the switching speed of PWs can be significantly improved, and the traffic loss can be reduced.

Figure 3:
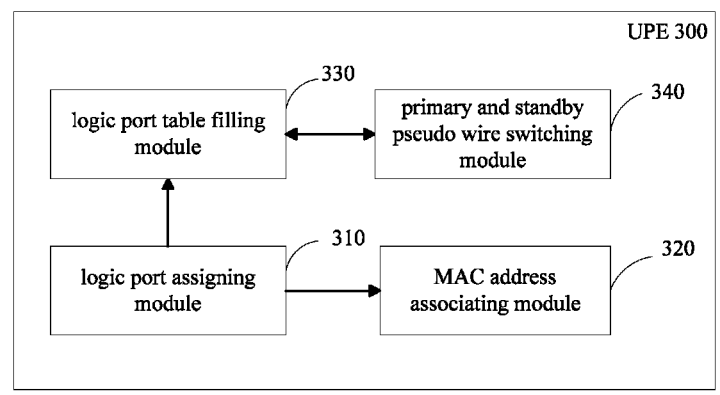
FIG. 3 illustrates a schematic diagram of the structure of a UPE according to an example.

With reference to FIG. 3 now, FIG. 3 illustrates a schematic diagram of the structure of a UPE according to another example. As shown in FIG. 3, the UPE 600 includes a logic port assigning module 310, an MAC address associating module 320, a logic port table filling module 330 and a primary and standby pseudo wire switching module 340.

The logic port assigning module 310 is used for assigning to each pair of primary pseudo wire and standby pseudo wire a logic port number to be shared by said primary pseudo wire and standby pseudo wire, and for sending the corresponding relationships between the primary pseudo wire, the standby pseudo wire and the logic port number to the MAC address associating module 320 and the logic port table filling module 330.

The MAC address associating module 320 is used for associating an MAC address associated with a pair of primary pseudo wire and standby pseudo wire with the logic port number shared by the primary pseudo wire and standby pseudo wire when learning an MAC address.

The logic port table filling module 330 is used for filling in the logic port table the entries containing the following information for each logic port: a logic port number, a primary pseudo wire inbound-label, a standby pseudo wire inbound-label, a primary pseudo wire outbound-label, a standby pseudo wire outbound-label and information of leaving a public network.

The primary and standby pseudo wire switching module 340 is used, when the primary pseudo wire is active, for setting the corresponding information of leaving the public network in the logic port table as: performing the message forwarding by using the primary pseudo wire outbound-label and the public network entries of the primary pseudo wire; when the primary pseudo wire becomes inactive, for setting the corresponding information of leaving the public network in the logic port table as: performing the message forwarding by using the standby pseudo wire outbound-label and the public network entries of the standby pseudo wire; and when the primary pseudo wire is restored and needs to be used, for setting the corresponding information of leaving the public network in the logic port table as: performing the message forwarding by using the primary pseudo wire outbound-label and the public network entries of the primary pseudo wire.

when a user designates a pair of primary pseudo wire and standby pseudo wire under VSI and assigns to each pair of primary pseudo wire and standby pseudo wire a logic port number to be shared by said primary pseudo wire and standby pseudo wire, the logic port assigning module 310 is further used for recording the corresponding relationships between the primary pseudo wire, the standby pseudo wire and the logic port number.

According to an example, the logic port table filling module 330 is further used for filling in each entry of the logic port table the information of a primary peer IP address and a standby peer IP address.

According to an example, the assigned logic port number to be shared by the primary pseudo wire and standby pseudo wire is unique within the present VSI.

It can be seen from the above description that an example of the present disclosure enables the primary and standby PWs to share the same logic port number. When a PW becomes inactive, the switching from the primary PW to the standby PW is achieved by modifying the information of leaving the public network in the logic port table, so that the traffic is quickly forwarded to a corresponding PE through an active PW, without the switching being sensed by the MAC address table. According to the example of the present disclosure, because the update of the MAC address table is not triggered, therefore the switching speed of PWs can be significantly improved, the bandwidth waste in case of many MAC addresses can be alleviated and the traffic loss can be reduced.

From the above depiction of the implementation mode, the above examples can be implemented by hardware, software or firmware or a combination thereof. For example the various methods, processes, modules and functional units described herein may be implemented by a processor (the term processor is to be interpreted broadly to include a CPU, processing unit, ASIC, logic unit, or programmable gate array etc.) The processes, methods and functional units may all be performed by a single processor or split between several processors. They may be implemented as machine readable instructions executable by one or more processors. Further the teachings herein may be implemented in the form of a software product. The computer software product is stored in a storage medium and comprises a plurality of instructions for making a computer device (which can be a personal computer, a server or a network device, etc.) implement the method recited in the examples of the present disclosure.

The figures are only illustrations of an example, wherein the modules or procedure shown in the figures are not necessarily essential for implementing the present disclosure. Moreover, the sequence numbers of the above examples are only for description, and do not indicate an example is more superior to another.

Those skilled in the art can understand that the modules in the device in the example can be arranged in the device in the example as described in the example, or can be alternatively located in one or more devices different from that in the example. The modules in the aforesaid example can be combined into one module or further divided into a plurality of sub-modules.

Although the flow diagrams described above show a specific order of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The invention claimed is:

1. A method for fast switching traffic in a hierarchical virtual private LAN service, for use in a User-facing Provider Edge (UPE) device, wherein said method comprises:
    assigning to each pair of primary pseudo wire and standby pseudo wire a logic port number to be shared by said primary pseudo wire and standby pseudo wire;
    when learning a media access control (MAC) address, associating an MAC address associated with a pair of primary pseudo wire and standby pseudo wire with the logic port number shared by the primary pseudo wire and standby pseudo wire;
    filling, in a logic port table, entries containing the following information for each logic port: a logic port number, a primary pseudo wire inbound-label, a standby pseudo wire inbound-label, a primary pseudo wire outbound-label, a standby pseudo wire outbound-label and information of leaving a public network;
    when the primary pseudo wire is active, setting the corresponding information of leaving the public network in the logic port table as: performing message forwarding by using the primary pseudo wire outbound-label and public network entries of the primary pseudo wire; and
    when the primary pseudo wire becomes inactive, setting the corresponding information of leaving the public network in the logic port table as: performing message forwarding by using the standby pseudo wire outbound-label and public network entries of the standby pseudo wire.

2. The method according to claim 1, wherein,
    when a pair of primary pseudo wire and standby pseudo wire are designated under a virtual switch instance (VSI), a logic port number is assigned to each pair of primary pseudo wire and standby pseudo wire to be shared by said primary pseudo wire and standby pseudo wire;
    or, when a pseudo wire signaling generates a control plane table entry for the logic port table, a logic port number is assigned to each pair of primary pseudo wire and standby pseudo wire to be shared by said primary pseudo wire and standby pseudo wire;
    or, when a data plane saves a forwarded table entry, a logic port number is assigned to each pair of primary pseudo wire and standby pseudo wire to be shared by said primary pseudo wire and standby pseudo wire.

3. The method according to claim 1, wherein each entry in said logic port table further contains the information of a primary peer IP address and a standby peer IP address.

4. The method according to claim 1, wherein the assigned logic port number to be shared by the primary pseudo wire and standby pseudo wire is unique within a virtual switch instance (VSI).

5. A User-facing Provider Edge (UPE) device, wherein said UPE comprises: a logic port assigning module, an media access control (MAC) address associating module, a logic port table filling module and a primary and standby pseudo wire switching module; wherein,
    the logic port assigning module is to assign to each pair of primary pseudo wire and standby pseudo wire a logic port number to be shared by said primary pseudo wire and standby pseudo wire, and send the corresponding relationships between the primary pseudo wire, the standby pseudo wire and the logic port number to the MAC address associating module and the logic port table filling module;

the MAC address associating module is to associate an MAC address associated with a pair of primary pseudo wire and standby pseudo wire with the logic port number shared by the primary pseudo wire and standby pseudo wire when learning an MAC address;

the logic port table filling module is to fill, in the logic port table, entries containing the following information for each logic port: a logic port number, a primary pseudo wire inbound-label, a standby pseudo wire inbound-label, a primary pseudo wire outbound-label, a standby pseudo wire outbound-label and information of leaving a public network; and the primary and standby pseudo wire switching module is, when the primary pseudo wire is active, to set the corresponding information of leaving the public network in the logic port table as: performing message forwarding by using the primary pseudo wire outbound-label and public network entries of the primary pseudo wire; when the primary pseudo wire becomes inactive, to set the corresponding information of leaving the public network in the logic port table as: performing message forwarding by using the standby pseudo wire outbound-label and public network entries of the standby pseudo wire; and when the primary pseudo wire is restored and needs to be used, to set the corresponding information of leaving the public network in the logic port table as: performing message forwarding by using the primary pseudo wire outbound-label and the public network entries of the primary pseudo wire.

6. The UPE according to claim 5, wherein when a user designates a pair of primary pseudo wire and standby pseudo wire under a virtual switch instance (VSI) and assigns to each pair of primary pseudo wire and standby pseudo wire a logic port number to be shared by said primary pseudo wire and standby pseudo wire, the logic port assigning module is to record the corresponding relationships between the primary pseudo wire, the standby pseudo wire and the logic port number.

7. The UPE according to claim 5, wherein the logic port table filling module is further to fill in each entry of the logic port table the information of a primary peer IP address and a standby peer IP address.

8. The UPE according to claim 5, wherein the assigned logic port number to be shared by the primary pseudo wire and standby pseudo wire is unique within a virtual switch instance (VSI).

* * * * *